United States Patent [19]

Flebbe

[11] Patent Number: 4,754,791
[45] Date of Patent: Jul. 5, 1988

[54] VEHICLE WHEEL AND PNEUMATIC TIRE ASSEMBLY HAVING A COUNTER-WEIGHT

[75] Inventor: Werner Flebbe, Neustadt, Fed. Rep. of Germany

[73] Assignee: Continental Aktiengesellschaft, Hanover, Fed. Rep. of Germany

[21] Appl. No.: 896,387

[22] Filed: Aug. 13, 1986

[30] Foreign Application Priority Data

Aug. 17, 1985 [DE] Fed. Rep. of Germany ....... 3529510

[51] Int. Cl.⁴ .............................................. B60B 13/00
[52] U.S. Cl. ............................ 152/380; 152/DIG. 20; 301/5 B
[58] Field of Search ............ 301/5 B, 5 BA; 152/380, 152/DIG. 20

[56] References Cited

U.S. PATENT DOCUMENTS 4,623,009 11/1986 Seitz et al. ................... 152/DIG. 20

FOREIGN PATENT DOCUMENTS 3312482 10/1984 Fed. Rep. of Germany ... 152/DIG. 20

Primary Examiner—James B. Marbert
Attorney, Agent, or Firm—Becker & Becker, Inc.

[57] ABSTRACT

A vehicle wheel and pneumatic tire assembly having a counter-weight. The assembly includes a rigid rim having essentially radially inwardly extending rim flanges, a pneumatic vehicle tire, the beads of which are mounted on the radially inner side of the rim next to the rim flanges, and respective cover rings that occupy any space disposed axially inwardly of each tire bead. In order after a counter-weight has been mounted to prevent dirt or water from penetrating between the tire bead and the cover ring, a mounting element, which serves to support the counter-weight, extends into a slot of the cover ring. The base of this slot is disposed within the cover ring.

7 Claims, 1 Drawing Sheet

VEHICLE WHEEL AND PNEUMATIC TIRE ASSEMBLY HAVING A COUNTER-WEIGHT

BACKGROUND OF THE INVENTION

The present invention relates to a vehicle wheel and pneumatic tire assembly having a counter-weight. The assembly includes a rigid rim having essentially radially inwardly extending rim flanges, a pneumatic vehicle tire, the bead regions of which are mounted on the radially inner side of the rim next to the rim flanges, and respective cover rings that occupy any space disposed axially inwardly of each bead.

A wheel and tire assembly of this general type is described, for example, in German Offenlegungsschrift No. 33 12 482. With this heretofore known wheel and tire assembly, a counter-weight is attached in such a way that its anchoring element is forced into the slot between the tire bead and the cover ring. However, this can lead to such great deformation of the cover ring, or of the rubber of the tire bead, in the vicinity of the anchoring element, that water and/or dirt can penetrate the slot and can, under certain conditions, penetrate all the way to the rim ring.

It is therefore an object of the present invention to provide a wheel and tire assembly of the aforementioned general type with a counter-weight where the sealing function of the cover ring is retained in its entirety.

BRIEF DESCRIPTION OF THE DRAWING

This object, and other objects and advantages of the present invention, will appear more clearly from the following specification in conjunction with the accompanying schematic drawing, in which.

SUMMARY OF THE INVENTION

The vehicle wheel and pneumatic tire assembly of the present invention is characterized primarily by a mounting element that serves for supporting the counter-weight, with the mounting element extending into a slot of the cover ring, with the base of the slot still being disposed within the cover ring.

The inventive concept is essentially that the slot or slit into which the mounting element for the counter-weight is driven is shifted from the interface region between the cover ring and the tire bead into the interior of the cover ring. Furthermore, the depth of the slot is such that it still terminates within the cover ring. The advantage achieved with this inventive configuration is that even when water penetrates into the vicinity of the mounting element, no damage can occur therefrom because the water cannot penetrate as far as the rim ring.

Pursuant to one advantageous specific embodiment of the present invention, the slot for the securement of the counter-weight is disposed axially outwardly as far as possible on the cover ring, yet without contacting the axially outer edge of the cover ring. It is furthermore expedient to utilize an angular mounting element, and to dispose that leg thereof that is provided with the counter-weight at the level of the tire bead.

Further specific features of the present invention will be described in detail subsequently.

DESCRIPTION OF PREFERRED EMBODIMENTS

Figure 1:
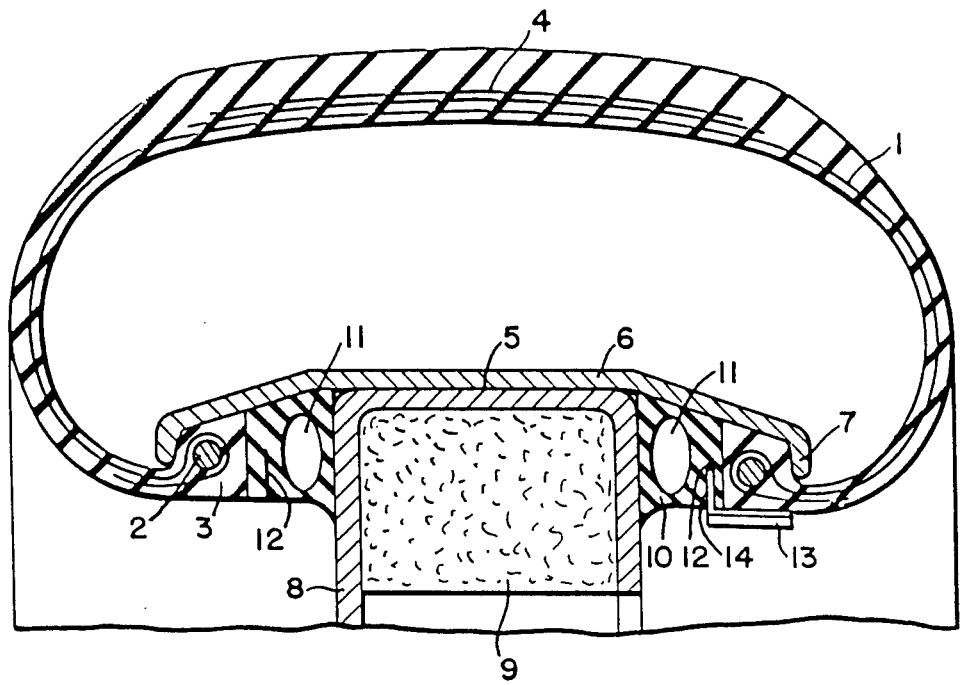
FIG. 1 is a partial radial section of one inventive embodiment of a wheel and tire assembly that has counter-weight.

Referring now to the drawing in detail, the wheel and tire assembly of FIG. 1 illustrates a belted tire that has a radial carcass 1, the ends of which are anchored in the beads 3 by being looped around the bear cores 2. The tire has a conventional belt 4, and is mounted on a wheel 5 in such a way that the bead seating surfaces are disposed next to the radially inwardly extending rim flanges 7 on the radially inner side of the rim 6. The rim 6 is secured to a well 8, the radially outer region of which has a U-shaped cross-sectional shape. This U-shaped region is filled with a foamed ring 9 to prevent dirt and rain water from entering therein. The spaces between the two tire beads 3, the rim 6, and the well 8 are closed off or occupied by respective rubber cover rings 10 which, to save weight, can be provided with hollow spaces 11.

In this embodiment, each cover ring 10 is provided with a circumferential or annular, radially inwardly open groove or slot 12, which can be so narrow that in the extreme case it becomes a slit (see the left side of FIG. 1). The slot 12 should be disposed as far axially outwardly as possible in the cover ring 10, yet without contacting that edge of the cover ring 10 that is adjacent to the tire bead 3. The slot 12 serves for the attachment of a counter-weight 13 that is supported, for example, with the aid of an angular insertion bracket or clip 14. The counter-weight 13 can be disposed above or below (i.e. radially inwardly or outwardly of) one leg of the insertion clip 14 at the level of the tire bead 3. The depth of the slot 12 is such that the clip 14 can be securely anchored. Depths that correspond to approximately half of the thickness of the cover ring have proven to be successful. If necessary, it is, of course, also possible to use clips that are anchored by being glued. It should be noted that if necessary, it also possible to provide individual slot sections along the circumference of the cover ring 10 in place of a single annular slot 12.

In an extreme case, these individual slot sections can be holes that are distributed uniformly over the circumference of the cover ring. In the context of the present application, this similar variation also falls under the term "slot".

Figure 2:
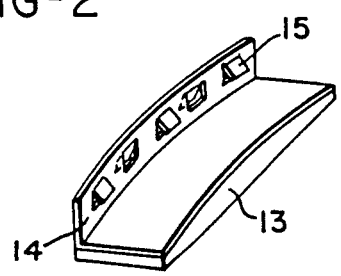
FIG. 2 is a perspective view of a counter-weight that is disposed on an insertion clip.

By way of example, FIG. 2 illustrates a known counter-weight 13 which in this case is disposed on an angular insertion clip 14. Located in the free leg of the clip 14 are partially punched-off tangs 15 that are bent out to the side, so that after the counter-weight 13 has been mounted, the tangs hold the counter-weight by being retained in the cover ring 10. Rods with dowel-like mounting elements could also be used in place of the insertion clip 14.

The present invention is, of course, in no way restricted to the specific disclosure of the specification and drawing, but also encompasses any modifications within the scope of the appended claims.

What I claim is:

1. In a vehicle wheel and pneumatic tire assembly having a counter-weight, with said assembly including a rigid rim having essentially radially inwardly extending rim flanges, a pneumatic vehicle tire, the beads of which are mounted on the radially inner side of said rim next to said rim flanges, and respective cover rings that occupy spaces disposed axially inwardly of each of said beads between each bead and said wheel, the improvement wherein:

each of said respective cover rings has slot means, with each of said slot means having a base that is disposed within its cover ring; and respective mounting elements for supporting a given one of said counter-weights, with each mounting element extending into one of said slot means.

2. A wheel and tire assembly according to claim 1, in which said slot means of each cover ring is disposed as far axially outwardly as possible in said cover ring without contacting the axially outer edge of the latter.

3. A wheel and tire assembly according to claim 1, in which said slot means is in the form of a slit.

4. A wheel and tire assembly according to claim 1, in which said slot means is annular.

5. A wheel and tire assembly according to claim 1, in which said slot means has a depth corresponding to approximately 50% of the thickness of said cover ring.

6. A wheel and tire assembly according to claim 1, in which each of said mounting elements is in the form of an insertion clip.

7. A wheel and tire assembly according to claim 1, in which of each said mounting elements is angular, having a first leg on which is secured a counter-weight, and a second leg that is inserted in said slot means in such a way that said counter-weight is then disposed at the level of one of said tire beads.

* * * * *